(12) United States Patent
Matsunaga

(10) Patent No.: US 9,115,727 B2
(45) Date of Patent: Aug. 25, 2015

(54) MASTER CYLINDER APPARATUS

(71) Applicant: NISSIN KOGYO CO., LTD., Nagano (JP)

(72) Inventor: Yoshiteru Matsunaga, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 388 days.

(21) Appl. No.: 13/682,834

(22) Filed: Nov. 21, 2012

(65) Prior Publication Data

US 2013/0139501 A1    Jun. 6, 2013

(30) Foreign Application Priority Data

Nov. 25, 2011    (JP) ................................. 2011-258350

(51) Int. Cl.
| | | |
|---|---|---|
| *B60T 11/20* | (2006.01) | |
| *B60T 11/26* | (2006.01) | |
| *F15B 1/26* | (2006.01) | |
| *F15B 7/08* | (2006.01) | |

(52) U.S. Cl.
CPC . *F15B 1/26* (2013.01); *B60T 11/20* (2013.01); *F15B 7/08* (2013.01)

(58) Field of Classification Search
CPC ....... B60T 13/142; B60T 11/22; B60T 17/06; B60T 11/203; B60T 11/26; F15B 1/26; F15B 7/08
USPC ............................. 60/562, 584, 585, 586, 588
See application file for complete search history.

(56) References Cited

U.S. PATENT DOCUMENTS

| | | | | |
|---|---|---|---|---|
| 2,552,033 A | * | 5/1951 | Bradbury ........................ | 60/589 |
| 2,776,538 A | * | 1/1957 | Schnell ........................... | 60/578 |
| 3,194,019 A | * | 7/1965 | Lepelletier ..................... | 60/560 |
| 3,545,206 A | * | 12/1970 | Belart ............................. | 60/588 |

(Continued)

FOREIGN PATENT DOCUMENTS

| | | |
|---|---|---|
| CN | 1671585 | 9/2005 |
| CN | 201132521 | 10/2008 |

(Continued)

OTHER PUBLICATIONS

Japanese Office Action for related Application No. 2011-258350 dated Sep. 9, 2013.

(Continued)

*Primary Examiner* — Nathaniel Wiehe
*Assistant Examiner* — Qi Gan
(74) *Attorney, Agent, or Firm* — Andrew M. Calderon; Roberts Mlotkowski Safran & Cole, P.C.

(57) ABSTRACT

A master cylinder apparatus A1 includes a master cylinder 1 and a reservoir 3. The master cylinder 1 transduces an input to a brake operator into a brake fluid pressure. The reservoir 3 includes a fluid supply hole 3a that is connected to the master cylinder 1. A base body 10 of the master cylinder 1 includes a first cylinder hole 11a into which a piston is inserted, a reservoir union port 13a to which the fluid supply hole 3a is connected, and a communication hole 13d. The communication hole 13d has one end opening in a bottom surface of the reservoir union port 13a, and the other end opening in an inner circumferential surface of the first cylinder hole 11a. A center axis O3 of the reservoir union port 13a passes through a position being apart from a center axis O1 of the first cylinder hole 11a.

20 Claims, 7 Drawing Sheets

(56) References Cited

U.S. PATENT DOCUMENTS

| | | | |
|---|---|---|---|
| 4,295,336 A | | 10/1981 | Falk |
| 4,393,655 A | * | 7/1983 | Komorizono .................. 60/585 |
| 6,042,200 A | * | 3/2000 | Hosoya et al. ............. 303/119.3 |
| 2002/0023437 A1 | * | 2/2002 | Kanazawa et al. ............. 60/562 |
| 2004/0011614 A1 | | 1/2004 | Feigel |
| 2005/0067891 A1 | * | 3/2005 | Ogiwara et al. ........... 303/113.4 |
| 2011/0108377 A1 | | 5/2011 | Bae et al. |

FOREIGN PATENT DOCUMENTS

| | | |
|---|---|---|
| CN | 101743155 | 6/2010 |
| CN | 102126490 | 7/2011 |
| CN | 102235450 | 11/2011 |
| JP | 2005104334 A | 9/2003 |
| JP | 2007099057 | 4/2007 |
| JP | 2007176277 | 7/2007 |
| JP | 2010254261 | 11/2010 |

OTHER PUBLICATIONS

Chinese Office Action for related Application No. 201210597915.6 dated Feb. 27, 2015, 14 pages.

* cited by examiner

MASTER CYLINDER APPARATUS

CROSS REFERENCE TO RELATED APPLICATION

This application is based on and claims priority under 35 U.S.C. §119 to Japanese Patent Application No. 2011-258350, filed on Nov. 25, 2011, the entire contents of which are incorporated herein by reference.

BACKGROUND

1. Technical Field

The invention relates to a master cylinder apparatus.

2. Related Art

A master cylinder apparatus for use in a vehicle brake system includes a master cylinder for transducing an input to an brake operator into a brake fluid pressure and a reservoir connected to the master cylinder (for example, see JP-A-2007-99057).

SUMMARY

In a master cylinder apparatus described in JP-A-2007-99057, it is desired to enhance the degree of freedom of layout for installation of the master cylinder apparatus in a vehicle. In particular, it has been desired to make effective use of a space around a base body of the master cylinder which is disposed around a brake operator. It should be noted that in a configuration in which a reservoir is mounted by forming its shape so as to avoid a housing of an ECU mounted on a master cylinder, there may be a situation in which the shape of the reservoir is complicated or the layout properties thereof is not good.

The present invention provides a master cylinder apparatus which can increase the degree of freedom of layout when the master cylinder apparatus is installed in a vehicle.

According to one embodiment of the invention, a master cylinder apparatus includes a master cylinder and a reservoir. The master cylinder transduces an input to a brake operator into a brake fluid pressure. The reservoir includes a fluid supply hole that is connected to the master cylinder. A base body of the master cylinder includes a master-cylinder hole into which a piston is inserted, a reservoir union port to which the fluid supply hole is connected, and a communication hole having one end opening in a bottom surface of the reservoir union port and the other end opening in an inner circumferential surface of the master-cylinder hole. A center axis of the reservoir union ports passes through a position being apart from a center axis of the master-cylinder hole.

With this configuration, the reservoir is located close to one side of the base body of the reservoir. Even if the shape of the reservoir is not formed into such a complicated shape as to avoid a part mounted on the base body, it is possible to ensure a large space being lateral to the reservoir on the other side of the base body. Consequently, it is possible to make effective use of the space around the base body.

In addition, the shape of the reservoir can be formed into, for example, a simple shape in which a connecting portion with the base body is provided below a center position of the reservoir.

When the bottom surface of the reservoir union port and the master-cylinder hole are projected onto a projection plane a normal line of which is the center axis of the reservoir union port, at least a part of the bottom surface of the reservoir unit port may overlap with the master-cylinder hole.

With this configuration, the communication hole which establishes a communication between the reservoir union port and the master cylinder hole can be formed in the axial direction of the reservoir union port. Therefore, it is possible to easily work the communication hole in the base body.

The master cylinder apparatus may further include a housing that stores a part. The housing may be attached to the base body. The center axis of the reservoir unit port may be deviated from the center axis of the master-cylinder hole to an opposite side to a housing side.

With this configuration, it is possible to ensure the installation space of the housing and increase the degree of freedom in laying out a cable which is connected to the housing.

The base body may include a stroke simulator that generates a pseudo operational reaction force to be applied to the brake operator. A center axis of an opening portion of the reservoir union port may be deviated from the center axis of the master-cylinder hole to a stroke-simulator side.

With this configuration, it is possible to dispose the reservoir in the space on the stroke simulator side where fewer pipes and cables are laid out.

In the above described master cylinder apparatus, it is possible to make effective use of the space around the base body of the master cylinder. Therefore, it is possible to increase the degree of freedom of layout for installation of the master cylinder apparatus in the vehicle.

DETAILED DESCRIPTION

Figure 1:
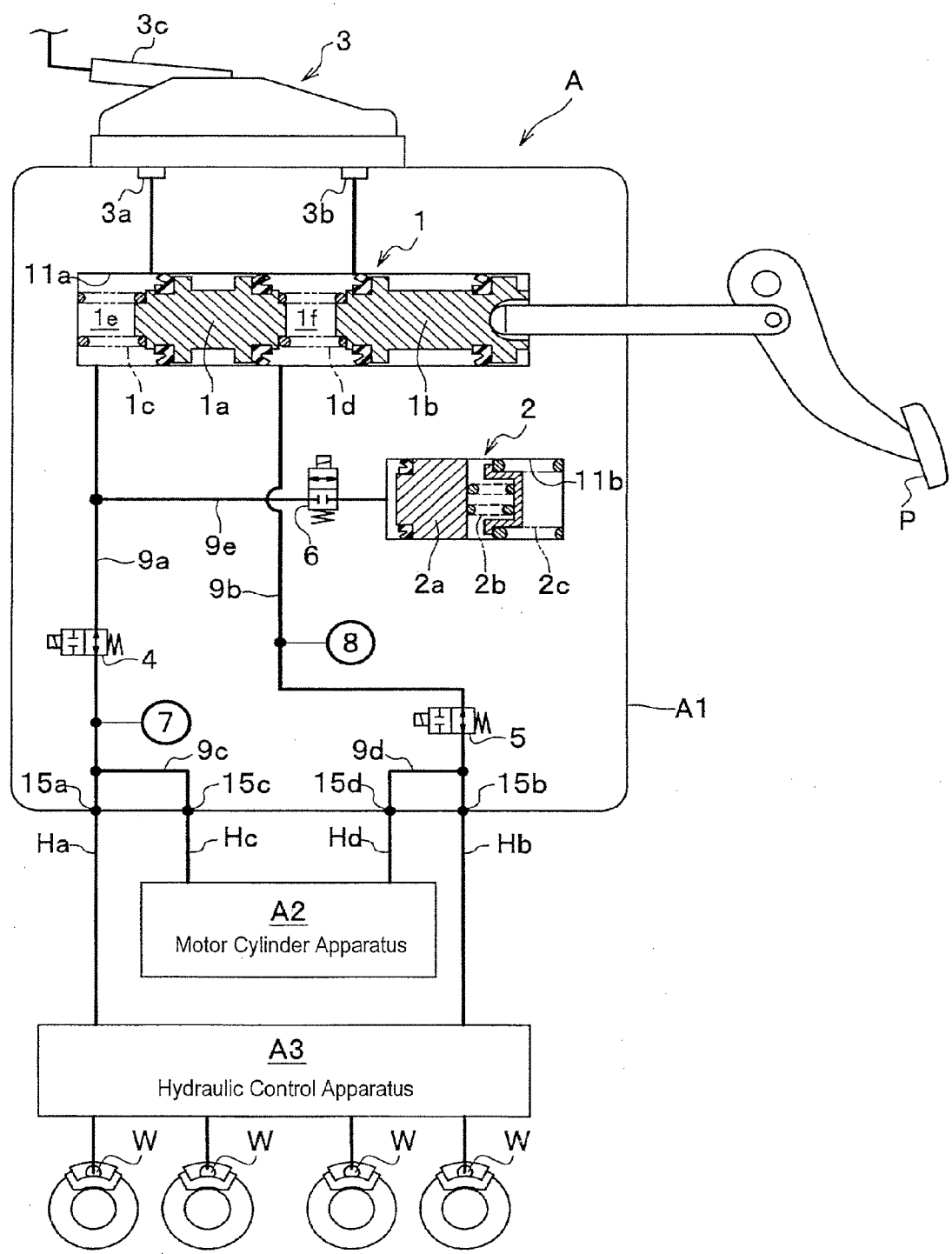
FIG. 1 is a configuration diagram showing the entire vehicle brake system employing a master cylinder apparatus according to a first embodiment.

Embodiments of the invention will be described in detail with reference to the drawings as required.

In the description of the embodiments, the same reference numerals will be assigned to to the same constituent elements, and the redundant description thereon will be omitted.

In each embodiment, an example where a master cylinder apparatus is applied to a vehicle brake system A shown in FIG. 1 will be described.

First Embodiment

The vehicle brake system A shown in FIG. 1 includes both a brake-by-wire system which operates when a prime mover (an engine or a motor) is activated and a hydraulic brake system which operates in an emergency or when the prime mover is stopped.

The vehicle brake system A includes a master cylinder apparatus A1 that generates a brake fluid pressure by a pressing force acting on a brake pedal (an example of a brake operator) P, a motor cylinder apparatus A2 that generates a brake fluid pressure by using an electric motor (not shown), and a vehicle stability assist apparatus A3 (hereinafter, referred to as a "hydraulic control apparatus A3") that assists the stabilization of behaviors of the vehicle.

The master cylinder apparatus A1, the motor cylinder apparatus A2, and the hydraulic control apparatus A3 are configured to be separate units and communicate with each other via external pipes.

The vehicle brake system A can be installed not only in a motor vehicle that uses an engine (an internal combustion engine) as a driving source, but also in a hybrid vehicle that uses a motor together with an engine, or an electric vehicle or a fuel cell vehicle that uses only a motor as a driving source.

The master cylinder apparatus A1 includes a tandem master cylinder 1, a stroke simulator 2, a reservoir 3, normally open shut-off valves 4, 5, a normally closed shut-off valve 6, pressure sensors 7, 8, main hydraulic lines 9a, 9b, communication lines 9c, 9d and a branch hydraulic line 9e.

The master cylinder 1 transduces the pressing force acting on the brake pedal P into the brake fluid pressure. The master cylinder 1 includes a first piston 1a that is disposed on a bottom surface side of a first cylinder hole 11a (an example of a master cylinder hole), a second piston 1b that is connected to a pushrod, a first return spring 1c that is disposed between the first piston 1a and a bottom surface of the primary cylinder hole 11a, and a second return spring 1d that is disposed between both the pistons 1a, 1b.

The second piston 1b is coupled to the brake pedal P via the pushrod. Both of the pistons 1a, 1b slide upon receipt of the pressing force acting on the brake pedal P to pressurize a brake fluid in pressure chambers 1e, 1f. The pressure chambers 1e, 1f communicate with the main hydraulic lines 9a, 9b.

The stroke simulator 2 generates a pseudo operational reaction force. The stroke simulator 2 includes a piston 2a that slides in the second cylinder hole 11b and two large and small return springs 2b, 2c that bias the piston 2a.

The stroke simulator 2 communicates with the pressure chamber 1e via the main hydraulic line 9a and the branch hydraulic line 9e and operates based on the brake fluid pressure generated in the pressure chamber 1e.

The reservoir 3 is a vessel that reserves the brake fluid. The reservoir 3 includes fluid supply holes 3a, 3b that are connected to the master cylinder 1 and a tube connection port 3c to which a hose extending from a main reservoir (not shown) is connected.

The normally open shut-off valves 4, 5 open and close the main hydraulic lines 9a, 9b. The normally open shut-off valve 4, 5 are both normally open solenoid valves.

The normally open shut-off valve 4 opens and closes the main hydraulic line 9a in a section extending from a point of intersection between the main hydraulic line 9a and the branch hydraulic line 9e to a point of intersection between the main hydraulic line 9a and the communication hydraulic line 9c.

The other normally open shut-off valve 5 opens and closes the main hydraulic line 9b on an upstream side of a point of intersection between the main hydraulic line 9b and the communication hydraulic line 9d.

The normally closed shut-off valve 6 opens and closes the branch hydraulic line 9e. The normally closed shut-off valve 6 is a normally closed solenoid valve.

The pressure sensors 7, 8 detect magnitudes of the brake fluid pressures. The pressure sensors 7, 8 are mounted in sensor mounting holes (not shown) that communicate with the main hydraulic lines 9a, 9b.

The pressure sensor 7 is disposed on a downstream side of the normally open shut-off valve 4 and detects the brake fluid pressure generated in the motor cylinder apparatus A2 when the normally open shut-off valve 4 is closed (when the main hydraulic line 9a is shut off).

The other pressure sensor 8 is disposed on an upstream side of the normally open shut-off valve 5 and detects the brake fluid pressure generated in the master cylinder 1 when the normally open shut-off valve 5 is closed (when the main hydraulic line 9b is shut off).

Information that the pressure sensors 7, 8 acquire are output to an electronic control unit (ECU), which is not shown.

The main hydraulic lines 9a, 9b are hydraulic lines that originate from the master cylinder 1. Pipe materials Ha, Hb extending to the hydraulic control apparatus A3 are connected to are connected to output ports 15a, 15b where the main hydraulic lines 9a, 9b terminate.

The communication hydraulic lines 9c, 9d are hydraulic lines that originate from input ports 15c, 15d and extend to the main hydraulic lines 9a, 9b. Pipe materials Hc, Hd extending to the motor cylinder apparatus A2 are connected to the input ports 15c, 15d.

The branch hydraulic line 9e is a hydraulic line that branches off from the main hydraulic line 9a and extends to the stroke simulator 2.

The master cylinder apparatus A1 communicates with the hydraulic control apparatus A3 via the pipe materials Ha, Hb. The brake fluid pressure generated in the master cylinder 1 when the normally open shut-off valves 4, 5 are open is input to the hydraulic control apparatus A3 via the main hydraulic lines 9a, 9b and the pipe materials Ha, Hb.

Although illustration is omitted, the motor cylinder apparatus A2 includes a slave piston that slides in the cylinder, an actuator mechanism having an electric motor and a driving force transmission section, and a reservoir that reserves the brake fluid in the cylinder.

The electric motor operates based on a signal from the electronic control unit, not shown. The driving force transmission section transforms the rotational power of the electric motor into a reciprocating motion and transmits it to the slave piston. The slave piston receives a driving force of the electric motor to slide in the cylinder and pressurize the brake fluid in the cylinder.

The brake fluid pressure generated in the motor cylinder apparatus A2 is input into the master cylinder apparatus A1 via the pipe materials Hc, Hd and is input into the hydraulic control apparatus A3 via the communication hydraulic lines 9c, 9d and the tubular members Ha, Hb. A hose extending from the main reservoir (not shown) is connected to the reservoir.

The hydraulic control apparatus A3 includes a configuration that enables execution of an anti-lock brake control (an ABS control) which suppresses slip of driven wheels, and an electronic stability control and a traction control which stabilize the behavior of the vehicle. The hydraulic control apparatus A3 is connected to wheel cylinders W via pipe materials.

Although illustration will be omitted, the hydraulic control apparatus A3 includes a hydraulic unit provided with solenoid valves and pumps, a motor that drives the pumps, and an electronic control unit that controls the solenoid valves and the motor.

Next, the operation of the vehicle brake system A will be briefly described.

In a normal state where the vehicle brake system A functions properly, the normally open shut-off valves 4, 5 are closed, while the normally closed shut-off valve 6 is opened.

When the brake pedal P is operated in this state, the brake fluid pressure generated in the master cylinder 1 is transmitted to the stroke simulator 2 without being transmitted to the wheel cylinders W, and the piston 2a is displaced, whereby the stroke of the brake pedal P is permitted, and the pseudo operational reaction force is imparted to the brake pedal P.

In addition, when the pressing of the brake pedal P is detected by a stroke sensor, not shown, the electric motor of the motor cylinder apparatus A2 is driven, and the slave piston is displaced, whereby the brake fluid in the cylinder is pressurized.

The electronic control unit, not shown, compares the brake fluid pressure output from the motor cylinder apparatus A2 (the brake fluid pressure detected by the pressure sensor 7) with the brake fluid pressure output from the master cylinder 1 (the brake fluid pressure detected by the pressure sensor 8) and controls the rotational speed of the electric motor based on the comparison result.

The brake fluid pressure generated in the motor cylinder apparatus A2 is transmitted to the respective wheel cylinders W via the hydraulic control apparatus A3, and when each wheel cylinder H operates, a braking force is imparted to each wheel.

It should be noted that in a state where the motor cylinder apparatus A2 does not operate (for example, when no electric power is supplied or in emergency), both the normally open shut-off valves 4, 5 are open, while the normally closed shut-off valve 6 is closed. Therefore, the brake fluid pressure generated in the master cylinder 1 is transmitted to the wheel cylinders W.

Next, a specific structure of the master cylinder apparatus A1 will be described.

Figure 2:
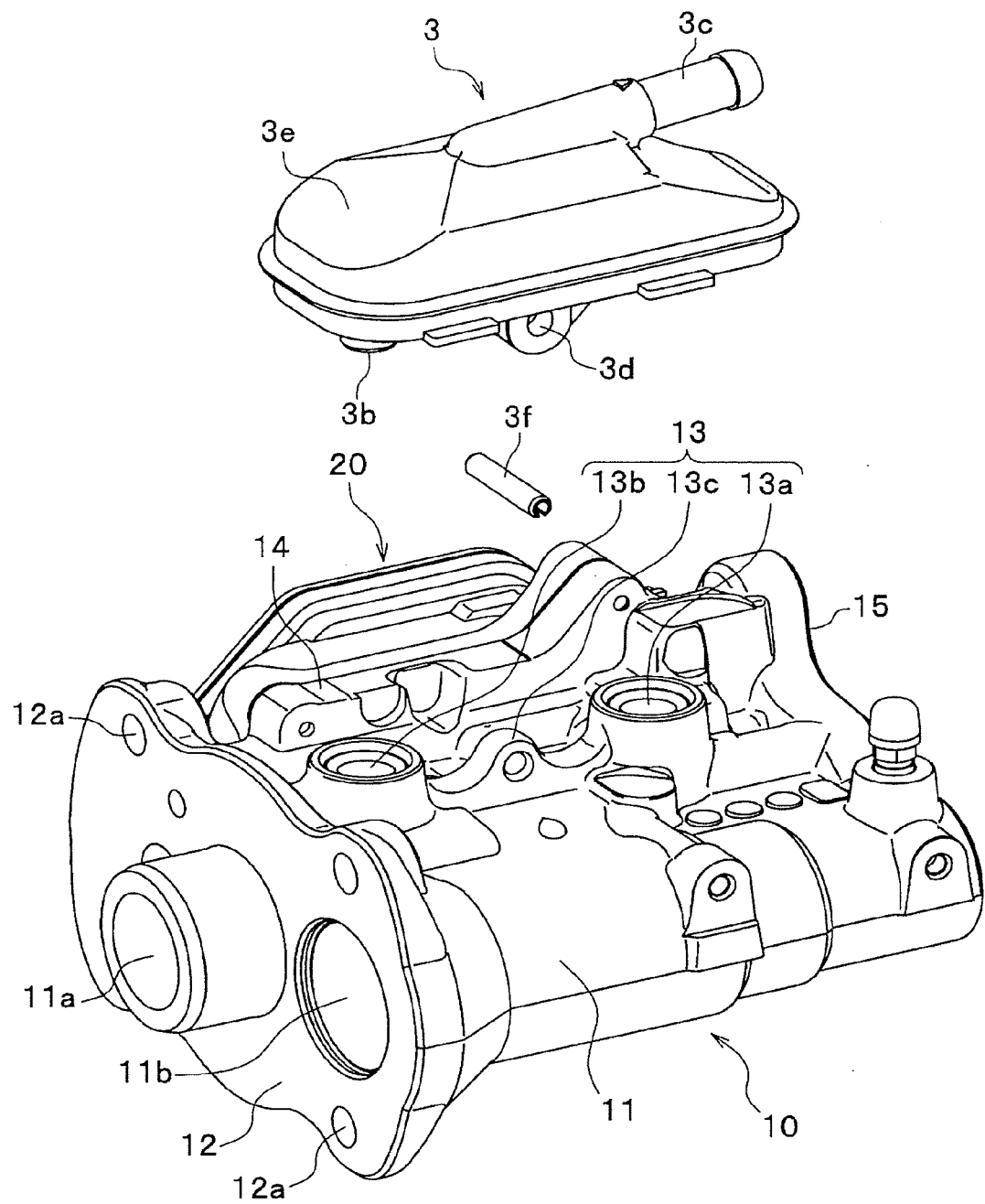
FIG. 2 is a perspective view of the master cylinder apparatus according to the first embodiment when viewed from a vehicle body fixing portion side.

The master cylinder apparatus A1 of a first embodiment is formed by assembling the constituent components described above inside or outside a base body 10 shown in FIG. 2 and covering the constituent components, which electrically operate (the normally open shut-off valves 4, 5, the normally closed shut-off valve 6, and the pressure sensors 7, 8) with a housing 20.

The base body 10 is a cast product made of an aluminum alloy. The base body 10 includes a cylinder portion 11, a vehicle body fixing portion 12, a reservoir mounting portion 13, a housing mounting portion 14 and a pipe connection portion 15. Also, holes (not shown) which constitute the main hydraulic lines 9a, 9b and the branch hydraulic line 9e are formed inside the base body 10.

The first cylinder hole 11a for the master cylinder and the second cylinder hole 11b for the stroke simulator are formed in the cylinder portion 11. Both of the cylinder holes 11a, 11b have a bottomed cylindrical shape. The cylinder holes 11a, 11b open in the vehicle body fixing portion 12 and extend towards the pipe connection portion 15.

The constituent components (the first piston 1a, the second piston 1b, the first return spring 1c, and the second return spring 1d), which constitute the master cylinder 1 (see FIG. 1), are inserted into the first cylinder hole 11a. The constituent components (the piston 2a and the return springs 2b, 2c), which constitute the stroke simulator 2, are inserted into the second cylinder hole 11b.

The vehicle body fixing portion 12 is a portion that is to be fixed to a vehicle body such as a toe board. The vehicle body fixing portion 12 is formed on a rear surface portion of the base body 10. The vehicle body fixing portion 12 exhibits a flange-like shape. Bolt insertion holes 12a are formed in a circumferential edge portion (a portion which projects from the cylinder portion 11) of the vehicle body fixing portion 12.

The reservoir mounting portion 13 is a portion that constitutes a mounting seat for the reservoir 3. The reservoir mounting portion 13 is formed on an upper surface portion of the base body 10. Two reservoir union ports 13a, 13b and a joining portion 13c are formed in the reservoir mounting portion 13.

Figure 4:
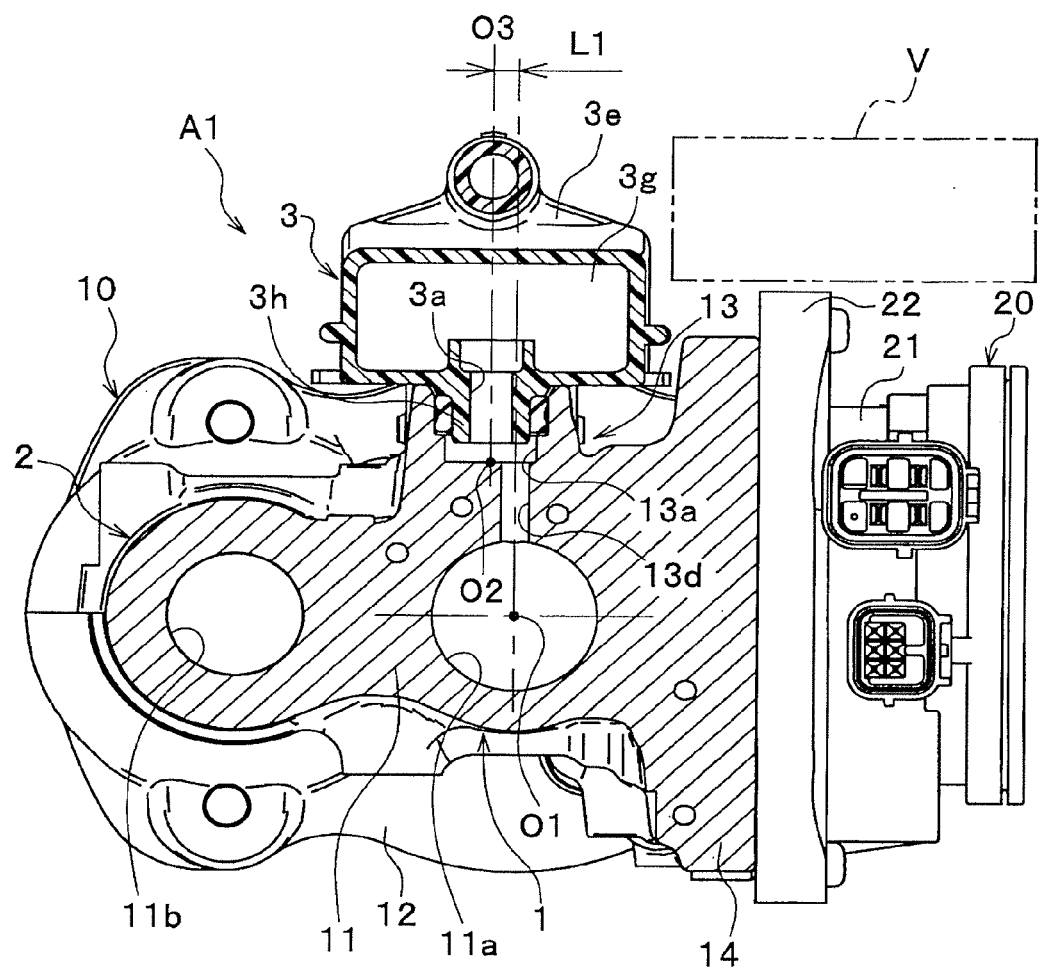
FIG. 4 is a section view of the master cylinder apparatus according to the first embodiment.

The reservoir union ports 13a, 13b both exhibit a cylindrical shape. The reservoir union ports 13a, 13b are provided on an upper surface of the cylinder portion 11 so as to project therefrom. As shown in FIG. 4, the reservoir union ports 13a, 13b communicate with the first cylinder hole 11a via communication holes 13d that extend from bottom surfaces thereof towards the first cylinder hole 11a.

It should be noted that the two reservoir union ports 13a, 13b have the same configuration. Therefore, in the following description, the reservoir union port 13a shown in FIG. 4 will be described in detail, and the description on the other reservoir union port 13b will be omitted.

The communication hole 13d of the first embodiment extends along an axial direction of the reservoir union port 13a. An upper end of the communication hole 13d opens in the bottom surface of the reservoir union port 13a. A lower end of the communication hole 13d opens in an inner circumferential surface of the first cylinder hole 11a.

A cylindrical fluid supply portion 3h that is provided on a lower surface of the reservoir 3 so as to project therefrom is inserted into an upper space of the reservoir union port 13a. A vessel main body 3e of the reservoir 3 is placed on an upper end of the reservoir union port 13a.

The fluid supply hole 3a, which communicates with a reserving space 3g of the vessel main body 3e, penetrates the fluid supply portion 3h of the reservoir 3 in an up and down direction.

The reserving space 3g and the first cylinder hole 11a are connected to each other via the fluid supply hole 3a, a lower space in the reservoir union port 13a, and the communication hole 13d.

The joining portion 13c is formed between the reservoir union ports 13a, 13b. The joining portion 13c is provided on the upper surface of the cylinder portion 11 so as to project therefrom. The joining portion 13c faces an upper end portion of the housing mounting portion 14.

Figure 3:
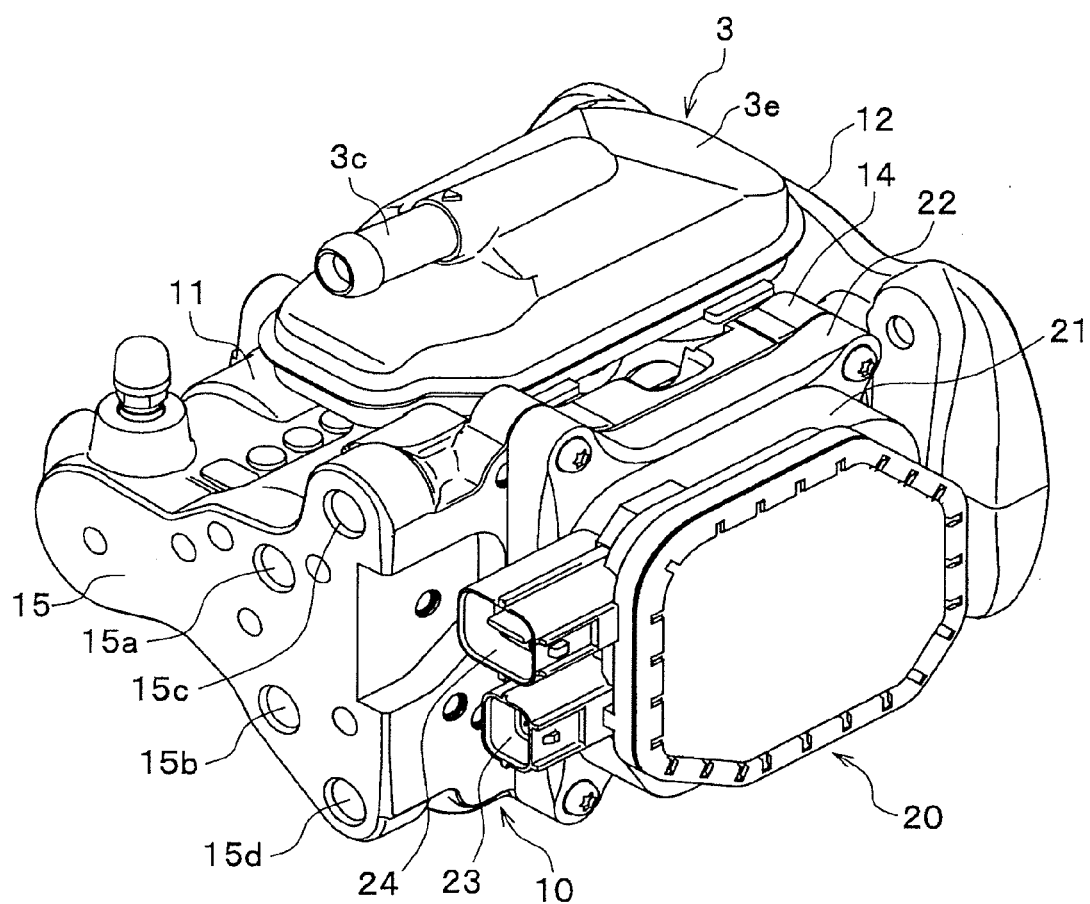
FIG. 3 is a perspective view of the master cylinder apparatus according to the first embodiment when viewed from a pipe connection portion side.

The housing mounting portion 14 is a portion that constitutes a mounting seat for the housing 20. The housing mounting portion 14 is formed on a side surface portion of the base body 10. As shown in FIG. 3, the housing mounting portion 14 exhibits a flange-like shape.

The upper end portion and a lower end portion of the housing mounting portion 14 project upwards and downwards from the cylinder portion 11. Female threads are formed on the upper end portion and the lower end portion (the portions projecting from the cylinder portion 11) of the housing mounting portion 14.

Although illustration will be omitted, three valve mounting holes and two sensor mounting holes are formed in the housing mounting portions 14. The normally open shut-off valves 4, 5 and the normally closed shut-off valve 6 (see FIG. 1) are assembled in the three valve mounting holes. The pressure sensors 7, 8 (see FIG. 1) are assembled in the two sensor mounting holes.

The pipe connection portion 15 is a portion that constitutes a pipe mounting seat. The pipe connection portion 15 is formed on a front surface portion of the base body 10. The two output ports 15a, 15b and the two input ports 15c, 15d are formed in the pipe connection portion 15.

The pipe materials Ha, Hb (see FIG. 1) extending to the hydraulic control apparatus A3 are connected to the output ports 15a, 15b. The pipe materials Hc, Hd (see FIG. 1) extending to the motor cylinder apparatus A2 are connected to the input ports 15c, 15d.

The housing 20 includes a housing main body 21 that fluid-tightly covers the components (the normally open shut-off valves 4, 5, the normally closed shut-off valve 6, and the pressure sensors 7, 8), which are assembled to the housing mounting portion 14, a flange portion 22 that is formed along the perimeter of the housing main body 21 and two connectors 23, 24 that are provided on the housing main body 21 so as to project therefrom.

Although illustration is omitted, electromagnetic coils for driving the normally open shut-off valves 4, 5 and the normally closed shut-off valve 6 are housed in the housing main body 21. Also, busbars extending to the electromagnetic coils and the pressure sensors 7, 8 are also housed therein.

The flange portion 22 is a portion that is securely pressed against the housing mounting portion 14. Screw insertion holes are formed in the flange portion 22 so as to correspond to the female threads formed in the housing mounting portion 14.

Both of the connectors 23, 24 have a cylindrical shape. The connectors 23, 24 are provided on a front surface of the housing main body 21 so as to project therefrom. Cables connecting to the electromagnetic coils and cables connecting to the pressure sensors 7, 8 are connected to the connectors 23, 24.

As shown in FIG. 2, in addition to the fluid supply holes 3a, 3b (see FIG. 1), the reservoir 3 has a pipe connection port 3c and a joining flange 3d. The shape of the reservoir 3 of this embodiment is formed into a simple shape in which a connection portion with the base body 10 is provided below a center position of the vessel main body 3e.

The pipe connection port 3c projects forward from the vessel main body 3e, which reserves the brake fluid. A hose extending from the main reservoir (not shown) is connected to the pipe connection port 3c.

The joining flange 3d is provided on a lower surface of the vessel main body 3e so as to project therefrom. The joining flange 3d is superposed on the joining portion 13c of the reservoir mounting portion 13 and is fixed to the joining portion 13c by a spring pin 3f.

Figure 5:
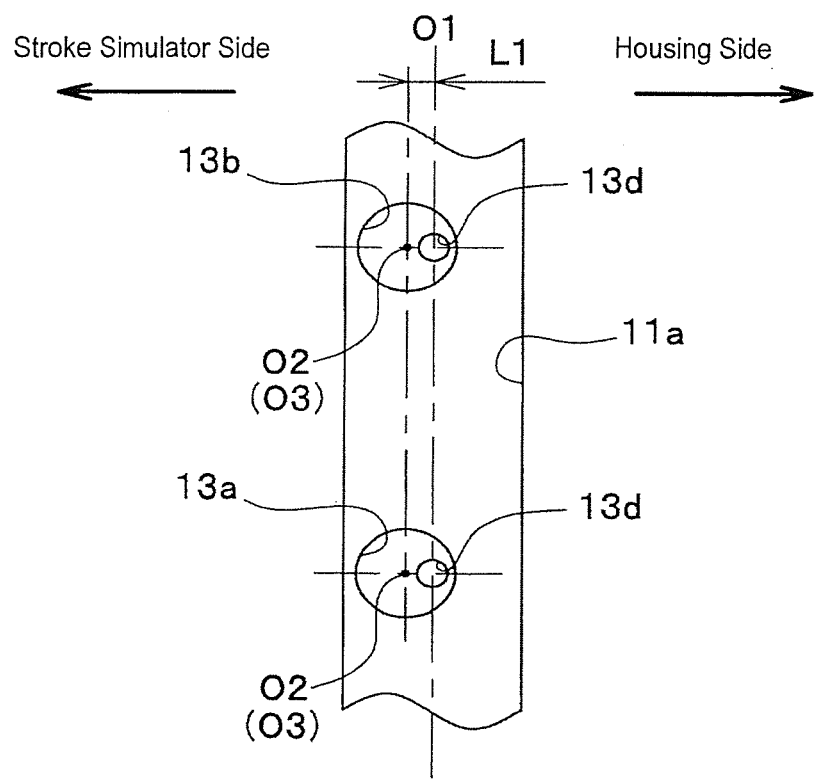
FIG. 5 is a projection view showing a positional relationship between reservoir union ports and a first cylinder hole, according to the first embodiment.

In the first embodiment, as shown in FIG. 5, a straight line connecting center positions O2, O2 of the bottom surfaces of the two reservoir union ports 13a, 13b is parallel to a center axis O1 of the first cylinder hole 11a. FIG. 5 is a diagram in which the bottom surfaces of the reservoir union ports 13a, 13b and a wall surface of the first cylinder hole 11a are projected onto a projection plane (an imaginary plane) whose normal line is center axes O3 of the reservoir union ports 13a, 13b.

The center positions O2, O2 of the reservoir union ports 13a, 13b are offset to a stroke simulator 2 side with respect to the center axis O1 of the first cylinder hole 11a so as to be away from the housing 20 in the projection plane. Namely, in the projection plane, the center positions O2, O2 of the reservoir union ports 13a, 13b are arranged so as not to overlap with the center axis O1 of the first cylinder hole 11a.

Thereby, as shown in FIG. 4, the reservoir 3 is mounted so as to be located closer to the stroke simulator 2 side of the base body 10.

Consequently, in the projection plane, compared with the configuration in which the center positions O2, O2 of the reservoir union ports 13a, 13b are arranged so as to overlap with the center axis O1 of the first cylinder hole 11a, that is, the configuration in which the center axis O3 passes through the center axis O1, a space V being lateral to the reservoir 3 is made larger on a housing 20 side of the base body 10.

Also, as shown in FIG. 5, in the projection plane, the bottom surfaces of the reservoir union ports 13a, 13b entirely overlap with the first cylinder hole 11a. Naturally, in the projection plane, the communication hole 13d also overlaps with the first cylinder hole 11a.

In the master cylinder apparatus A1 of the first embodiment as described above, as shown in FIG. 4, the reservoir 3 is located closer to the stroke simulator 2 side of the base body 10. Thereby, even if the shape of the vessel main body 3e of the reservoir 3 is not formed into such a complicated shape as to avoid the housing 20 mounted on the base body 10, the space V being lateral to the reservoir 3 on the housing 20 side of the base body 10 becomes large. Consequently, since the space around the base body 10 can be used effectively, it is possible to enhance the degree of freedom of layout for installation of the master cylinder apparatus A1 in the vehicle.

Also, the reservoir 3 is located closer to the stroke simulator 2 side (an opposite side to the housing 20 side) where a few pipes and cables are laid out in the space around the base body 10. Therefore, it is possible to ensure the space where the housing 20 is installed and enhance the degree of freedom of layout of the cables, which are connected to the housing 20.

Also, as shown in FIG. 5, in the projection plane, the bottom surfaces of the reservoir union ports 13a, 13b overlap with the first cylinder hole 11a, and the communication hole 13d is formed in the axial direction of the reservoir union ports 13a, 13b. Therefore, the communication hole 13d can easily be formed in the base body 10.

Thus, while the embodiment of the invention has been described heretofore, the invention is not limited to the first embodiment and hence can be modified appropriately without departing from its spirit.

For example, in the first embodiment, as shown in FIG. 5, in the projection plane, the bottom surfaces of the reservoir union ports 13a, 13b entirely overlap with the first cylinder hole 11a. However, such a configuration may be adopted that at least a part of the bottom surfaces of the reservoir union ports 13a, 13b overlap with the first cylinder hole 11a, and the communication hole 13d may be formed in the overlapping area (see FIG. 7).

Further, in the projection plane, the bottom surfaces of the reservoir union ports 13a, 13b may not overlap with the first cylinder hole 11a.

Also, although the axial direction of the communication hole 13d is parallel to the axial direction of the reservoir union ports 13a, 13b in the first embodiment, the axial direction of the communication hole 13d may be inclined with respect to the axial direction of the reservoir union ports 13a, 13b.

Also, in FIG. 4, the axial direction of the reservoir union ports 13a, 13b is formed to extend in the up and down direction (a vertical direction). However, the axial direction of the reservoir union ports 13a, 13b may be inclined.

Second Embodiment

Figure 6:
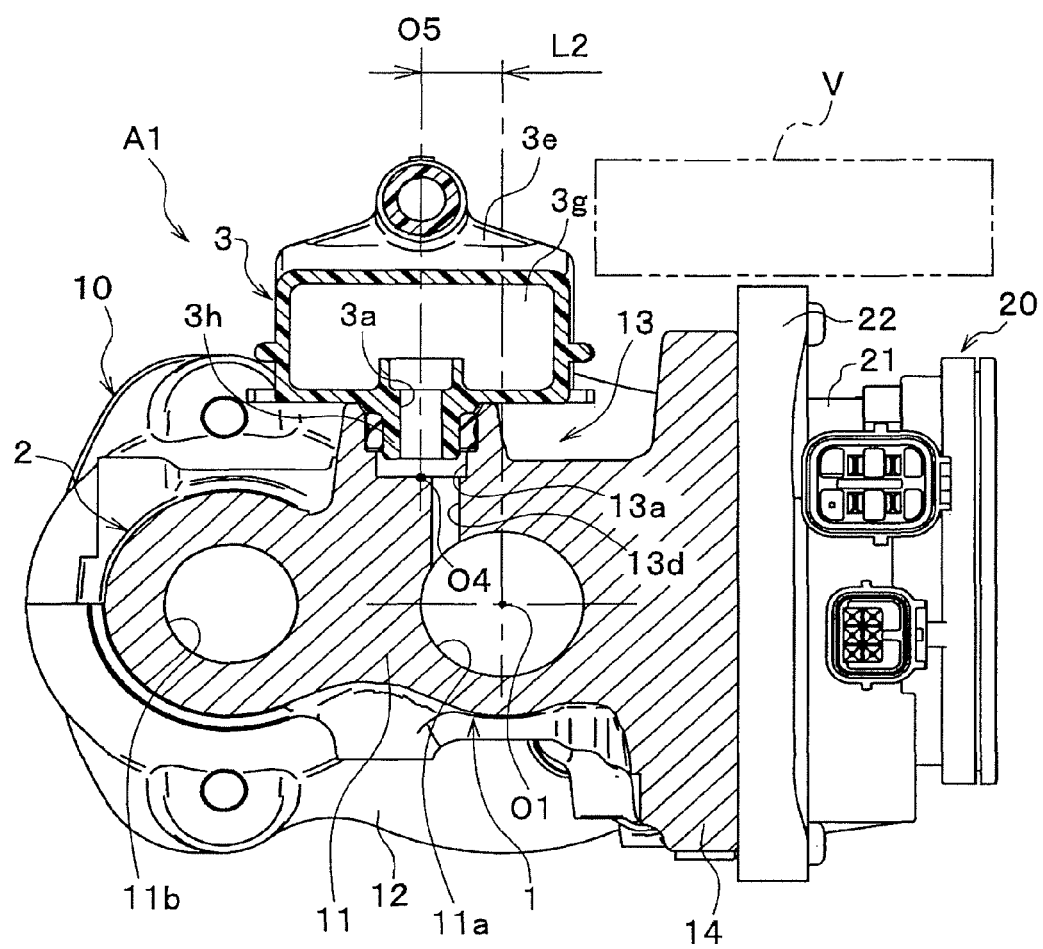
FIG. 6 is a section view of a master cylinder apparatus according to a second embodiment.
Figure 7:
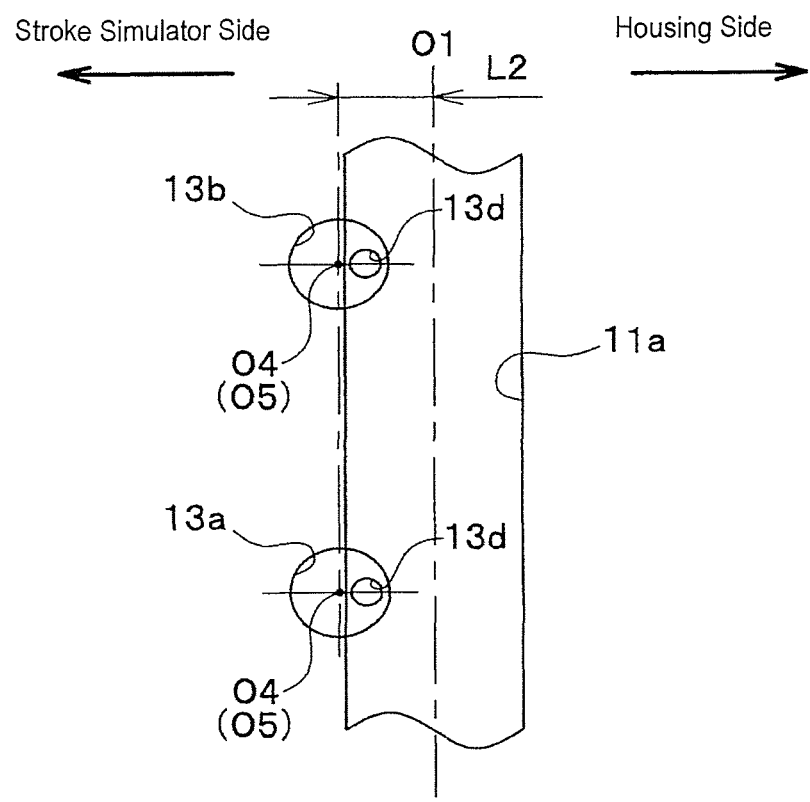
FIG. 7 is a projection view showing a positional relationship between reservoir union ports and a first cylinder hole, according to the second embodiment.

A master cylinder apparatus of a second embodiment has substantially the same configuration as that of the master cylinder apparatus A1 (see FIG. 4) of the first embodiment but is greatly different in that as shown in FIGS. 6 and 7, a space L2 between center positions O4, O4 (a center axis O5) of reservoir union ports 13a, 13b and a center axis O1 of a first cylinder hole 11a is larger than an interval L1 (see FIG. 4) between the center positions O2, O2 (the center axis O3) of the reservoir union ports 13a, 13b and the center axis O1 of the first cylinder hole 11a of the first embodiment.

In the master cylinder apparatus A1 of the second embodiment, as shown in FIG. 6, a reservoir 3 is located much closer to a stroke simulator 2 side of a base body 10, and a space V being lateral to the reservoir 3 becomes large on a housing 20 side of the base body 10. Therefore, it is possible to effectively use the space around the base body 10.

Also, as shown in FIG. 7, in a projection plane whose normal line is the center axis O5 of the reservoir union ports 13a, 13b, communication holes 13d are formed in bottom surfaces of the reservoir union ports 13a, 13b in side end portions on the housing 20 side and are arranged side end portions on a stroke simulator 2 side of the first cylinder hole 11a. Consequently, the reservoir union ports 13a, 13b can be located much closer to the stroke simulator 2 side without deterioration in workability of the communication hole 13d in the base body 10.

What is claimed is:

1. A master cylinder apparatus comprising:
   a master cylinder that transduces an input to a brake operator into a brake fluid pressure; and
   a reservoir including a fluid supply hole that is connected to the master cylinder, wherein
   a base body of the master cylinder includes
      a master-cylinder hole into which a piston is inserted,
      a reservoir union port to which the fluid supply hole is connected, and
      a communication hole having
         one end opening in a bottom surface of the reservoir union port, and
         the other end opening in an inner circumferential surface of the master-cylinder hole, and
   a center axis of the reservoir union ports passes through a position being apart from a center axis of the master-cylinder hole.

2. The apparatus of claim 1, wherein when the bottom surface of the reservoir union port and the master-cylinder hole are projected onto a projection plane a normal line of which is the center axis of the reservoir union port, at least a part of the bottom surface of the reservoir unit port overlaps with the master-cylinder hole.

3. The apparatus of claim 2, further comprising:
   a housing being attached to the base body, wherein
   the center axis of the reservoir unit port is deviated from the center axis of the master-cylinder hole to an opposite side to a housing side.

4. The apparatus of claim 3, wherein
   the base body includes a stroke simulator that generates a pseudo operational reaction force to be applied to the brake operator, and
   a center axis of an opening portion of the reservoir union port is deviated from the center axis of the master-cylinder hole to a stroke-simulator side.

5. The apparatus of claim 2, wherein
   the base body includes a stroke simulator that generates a pseudo operational reaction force to be applied to the brake operator, and
   a center axis of an opening portion of the reservoir union port is deviated from the center axis of the master-cylinder hole to a stroke-simulator side.

6. The apparatus of claim 1, wherein the communication hole extends along an axial direction of the reservoir union port and an upper end of the communication hole is directly connected and in fluid communication with a bottom of the reservoir union port and the lower end of the communication hole opens in an inner circumferential surface of the cylinder hole.

7. The apparatus of claim 6, wherein a center axis of the communication hole passes through a position aligned with the center axis of the master-cylinder hole.

8. The apparatus of claim 7, wherein a center axis of the communication hole is offset with respect to the center axis of the reservoir union ports.

9. The apparatus of claim 1, wherein when the bottom surface of the reservoir union port and the master-cylinder hole are projected onto a projection plane a normal line of which is the center axis of the reservoir union port, the entire bottom surface of the reservoir unit port overlaps with the master-cylinder hole.

10. The apparatus of claim 9, further comprising:
    a housing being attached to the base body, wherein
    the center axis of the reservoir unit port is deviated from the center axis of the master-cylinder hole to an opposite side to a housing side.

11. The apparatus of claim 10, wherein
    the base body includes a stroke simulator that generates a pseudo operational reaction force to be applied to the brake operator, and
    a center axis of an opening portion of the reservoir union port is deviated from the center axis of the master-cylinder hole to a stroke-simulator side.

12. The apparatus of claim 9, wherein
    the base body includes a stroke simulator that generates a pseudo operational reaction force to be applied to the brake operator, and
    a center axis of an opening portion of the reservoir union port is deviated from the center axis of the master-cylinder hole to a stroke-simulator side.

13. The apparatus of claim 1, further comprising:
    a housing being attached to the base body, wherein
    the center axis of the reservoir unit port is deviated from the center axis of the master-cylinder hole to an opposite side to a housing side.

14. The apparatus of claim 13, wherein
    the base body includes a stroke simulator that generates a pseudo operational reaction force to be applied to the brake operator, and
    a center axis of an opening portion of the reservoir union port is deviated from the center axis of the master-cylinder hole to a stroke-simulator side.

15. The apparatus of claim 1, wherein
    the base body includes a stroke simulator that generates a pseudo operational reaction force to be applied to the brake operator, and
    a center axis of an opening portion of the reservoir union port is deviated from the center axis of the master-cylinder hole to a stroke-simulator side.

16. A master cylinder apparatus comprising:
    a master cylinder that transduces an input to a brake operator into a brake fluid pressure;
    a reservoir including a fluid supply hole that is connected to the master cylinder, wherein
    a base body of the master cylinder includes
       a master-cylinder hole into which a piston is inserted,
       a reservoir union port to which the fluid supply hole is connected, and
       a communication hole having
          one end opening in a bottom surface of the reservoir union port, and
          the other end opening in an inner circumferential surface of the master cylinder, and a center axis of the reservoir union port and a center axis of the master-cylinder hole are skew lines.

17. The apparatus of claim 16, wherein when the bottom surface of the reservoir union port and the master-cylinder hole are projected onto a projection plane perpendicular to the center axis of the reservoir union port, at least a part of the bottom surface of the reservoir unit port overlaps with the master-cylinder hole.

18. The apparatus of claim 16, wherein when the bottom surface of the reservoir union port and the master-cylinder hole are projected onto a projection plane perpendicular to the center axis of the reservoir union port, the entire bottom surface of the reservoir unit port overlaps with the master-cylinder hole.

19. The apparatus of claim 16, further comprising:
a housing that stores a part, the housing being attached to the base body, wherein
the center axis of the reservoir unit port is deviated from the center axis of the master-cylinder hole to an opposite side to a housing side.

20. The apparatus of claim 16, wherein
the base body includes a stroke simulator that generates a pseudo operational reaction force to be applied to the brake operator, and
a center axis of an opening portion of the reservoir union port is deviated from the center axis of the master-cylinder hole to a stroke-simulator side.

* * * * *